June 4, 1940.　　　C. V. SHEARER　　　2,203,446
SPEED GOVERNOR AND DRIVING CONTROL FOR AUTOMOTIVE VEHICLES
Filed June 5, 1939　　　2 Sheets-Sheet 1
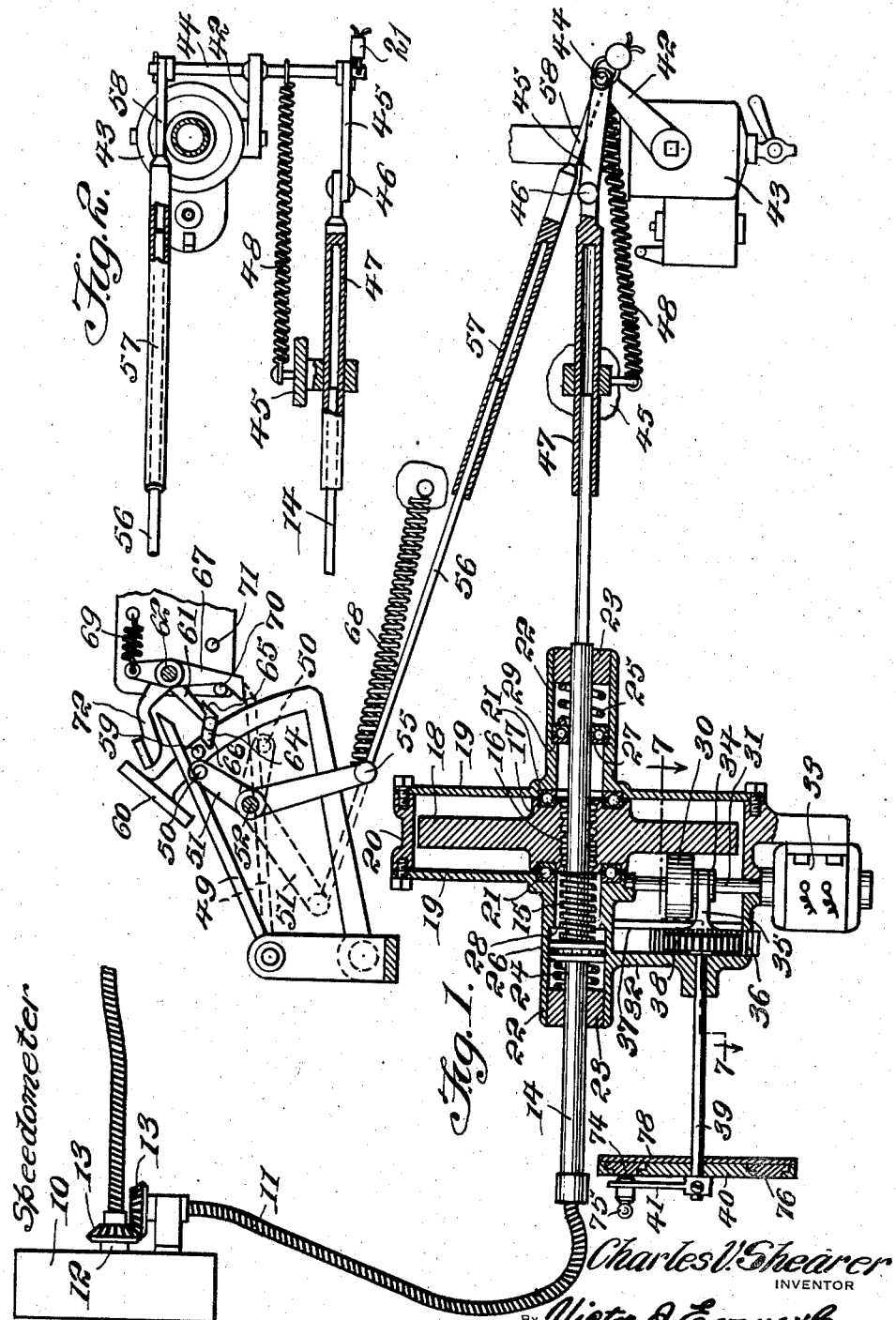

June 4, 1940.   C. V. SHEARER   2,203,446
SPEED GOVERNOR AND DRIVING CONTROL FOR AUTOMOTIVE VEHICLES
Filed June 5, 1939   2 Sheets-Sheet 2
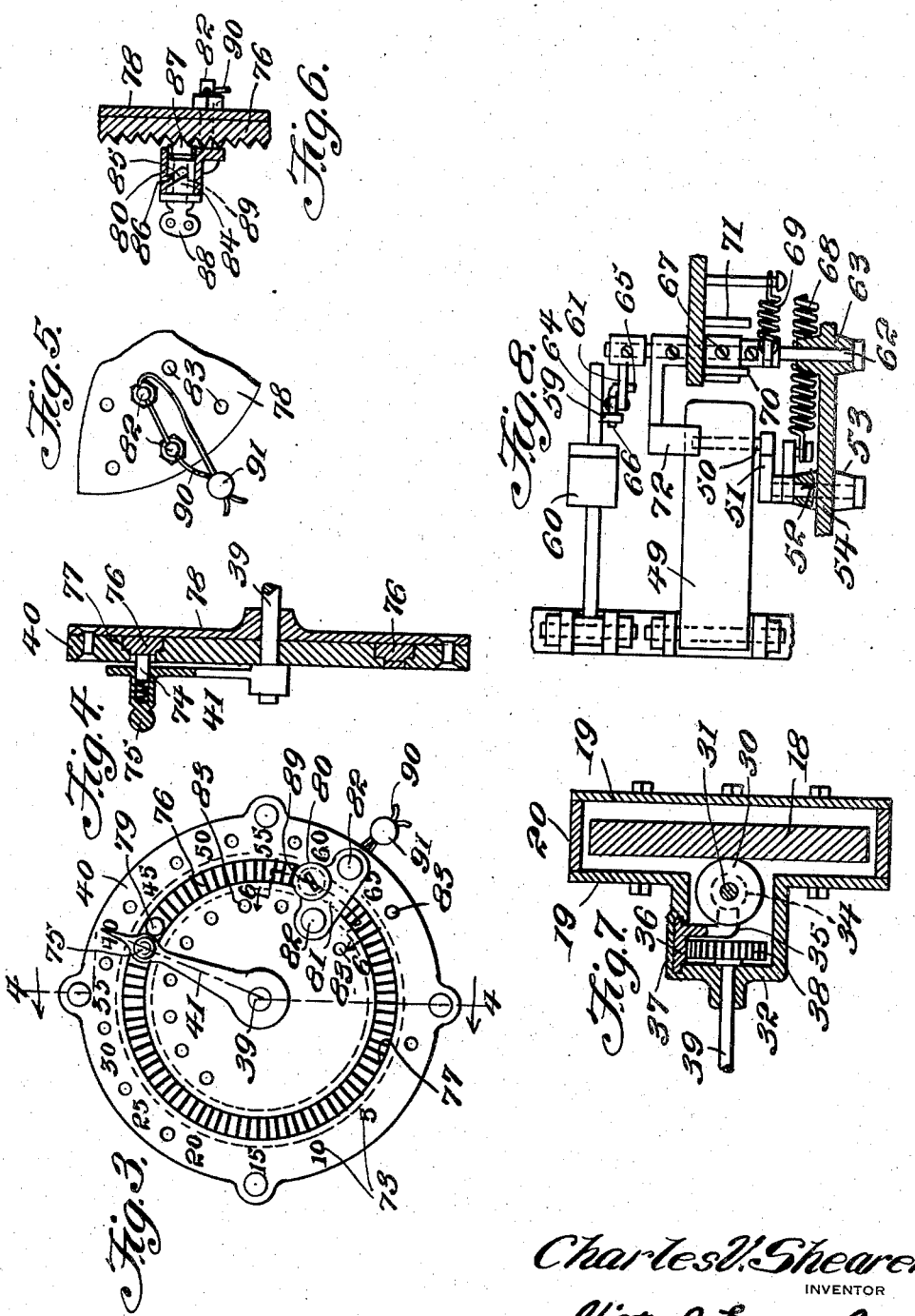
Charles V. Shearer
INVENTOR
BY Victor J. Evans & Co.
ATTORNEYS
WITNESS J. L. Wright Patented June 4, 1940

2,203,446

UNITED STATES PATENT OFFICE 2,203,446

SPEED GOVERNOR AND DRIVING CONTROL FOR AUTOMOTIVE VEHICLES

Charles V. Shearer, Capitan, N. Mex.

Application June 5, 1939, Serial No. 277,568

1 Claim. (Cl. 137—139)

This invention relates to a speed governor and driving control for automotive vehicles and has for an object to provide apparatus which will limit the speed of the vehicle to any desired speed, which may be instantly adjusted, and which may be adjusted to a top speed beyond which it can not be readjusted without authority of the proper key, or without breaking an official seal.

A further object is to provide apparatus of this type which will automatically drive the vehicle at the speed for which it is set without manual manipulation of the throttle, and includes means whereby any slight fluctuation of speed will cause a sufficient increase or decrease of fuel fed to the motor as may be necessary to restore the desired vehicle speed.

A further object is to provide apparatus of this character in which the throttle lever on the carbureter is adapted to respond to a dual control, either the conventional foot operated accelerator, or the governing mechanism of this invention, that is, either device may close the throttle lever, or either device may allow it to open, there being tension means for causing the throttle lever to open unless either the manually controlled foot accelerator or the governing mechanism causes it to close, or prevents it from opening beyond a certain point.

A further object of the invention is to provide apparatus of this type which essentially comprises two rotating members rotating in such a relative manner that when absolutely synchronized there will be no movement on the throttle lever, but when not in absolute synchronization, one will be propelled forward or backward to open or close the throttle lever as the case may be, one of these members being actuated by a moving part of the vehicle and in direct ratio to the speed of the vehicle and the other member being rotated by a separate source of power.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification.

Figure 1 is a longitudinal sectional view, with parts in elevation, of a speed governor and driving control constructed in accordance with the invention.

Figure 2 is a top plan view of the carburetor and parts associated therewith.

Figure 3 is a front elevation of the control dial for manually setting the device to limit the speed of the vehicle.

Figure 4 is a vertical sectional view taken on the line 4—4 of Figure 3 showing the pointer and spring pressed adjusting pin thereof.

Figure 5 is a fragmentary rear elevation of the dial shown in Figure 4 and showing the seal for locking the device permanently against being set for greater than predetermined speed.

Figure 6 is a detail sectional view taken on the line 6—6 of Figure 3 and showing the key operated mechanism for adjusting the abutment on the dial to limit the device to a top speed.

Figure 7 is a fragmentary cross sectional view taken on the line 7—7 of Figure 1 showing the two rotating members and the setting dial for changing the relative position of one member with respect to the other member.

Figure 8 is a top plan view of the accelerator pedal, the release pedal and parts of the mechanism operated thereby.

Referring now to the drawings in which like characters of reference designate similar parts in the various views, 10 designates a speedometer. A flexible shaft 11 is connected to the speedometer shaft 12 through the medium of meshing bevel gears 13 and has a speed of rotation in exact ratio to the speed of the vehicle at all times.

A governor rod 14 is connected at one end to the flexible shaft 11 to be rotated thereby and is provided intermediate its ends with a screw thread 15 adapted to mesh with a screw thread 16 formed axially in the hub 17 of a governor disc 18 which is rotatably mounted between the side plates 19 of a casing 20. Ball bearings 21 are disposed between the ends of the hub and the side plates to reduce friction.

The governor rod 14 is engaged axially through tubular bearings 22 which project from the side plates in alignment. The ends of the bearings are closed by walls 23 having openings which slidably rotatably receive the governor rod 14. Helical springs 24 and 25 are interposed between the walls 23 and ball bearing assemblies 26 and 27 carried by the rod. These assemblies are slidable in the tubular bearings 22 and are limited in movement under urge of their respective helical springs by shoulders 28 and 29 formed on the inner cylindrical walls of the tubular bearings 22.

The governor disc 18 is rotated through the medium of a friction wheel 30 which is disposed on a shaft 31 which is mounted in a gear case 32 integral with the casing 20 and which extends at a right angle to the governor rod 14. The shaft 31 is connected to a motor 33 or other suitable source of power for rotating the friction wheel 30 at a predetermined speed.

The friction wheel is mounted for sliding movement longitudinally of the motor shaft 31 to drive the governor disc 18 at a predetermined speed and for this purpose, as shown in Figure 7, it is provided with a grooved pulley 34 which in engaged by a yoke 35 carried by a rack 36 which is slidably mounted in a guide 37 disposed in the gear case 32. A pinion 38 is meshed with the rack and is provided with a shaft 39 which passes through a dial 40 on the instrument board and which is equipped with a hand 41, hereinafter more fully described, for moving the shaft 39 and consequently the rack 36, to dispose the friction disc 30 on the governor disc 18 at any radial position from the hub 17 thereof to the periphery of the disc.

When the speed of the motor driven governor disc 18 and the speed of the speedometer driven governor rod 14 are equal, that is synchronized, the threads 15 of the rod will be engaged with the threads 16 of the governor disc but there will be no endwise movement of the governor rod through the governor disc. Should, however, the governor rod 14 rotate slower than the governor disc 18, the rod 14 will be screwed endwise to the left until synchronization is restored, or if delayed, will cause it, rod 14, to be retracted out of the governor disc, as shown in Figure 1, and compress the spring 24 behind the ball bearing assembly 26. The spring is thus tensioned to move the rod back to engage the threads 16 of the governor disc 18 when the ratio of speed between the governor rod 14 and governor disc 18 is reversed, that is, when the governor rod 14 begins to rotate faster than the governor disc, thus screwing it endwise to the right until synchronization is restored. Or if delayed, will cause it to be advanced out of the governor disc and compress the spring 25 which thus becomes tensioned to cause the threads 15 to mesh with the threads 16 when the ratio of speed is again reversed.

The throttle lever 42 of the carburetor 43 is connected at its outer end to the center of the cross bar 44, best shown in Figure 2. One end of the bar is pivotally connected to one end of a link 45, the other end of the link being pivotally connected, as shown at 46, to a sleeve 47 which telescopically receives the governor rod 14. A helical spring 48 is connected at one end to the cross bar 44 and at the other end to a stationary bracket 49 in which the sleeve is slidably mounted. The spring constantly tends to open the throttle lever 42 and hold the sleeve telescoped on the control rod 14.

By referring now to Figures 1, 2 and 3, it will be seen that the foot accelerator pedal 49 bears at its free end upon a pin 50 which extends from the end of a crank arm 51 which is rotatably mounted on a stub shaft 52 disposed in a bearing 53 carried by a stationary part 54 of the vehicle. The free end of the bell crank lever is pivotally connected, as shown at 55, to a foot accelerator rod 56 which is telescopically engaged in a sleeve 57 having an integral extension 58 pivotally secured to the adjacent end of the cross bar 44.

It may now be seen that while the accelerator rod 56 may propel the throttle lever 42 to a closed position by contacting the end of the sleeve 57, it cannot retract the throttle lever to an open position. The accelerator rod may, however, pull out of the sleeve, and then the throttle lever actuated by the tension spring 48 will follow it, unless or until the governor mechanism, above described, propels the governor rod 14 into its sleeve 47, and causes the throttle lever to close, or allows it to open no farther. It will also be seen that the manual control of the carburetor through the foot accelerator pedal may permit the throttle lever 42 to move to full open or any intermediate position, by retracting the accelerator rod 56 out of the sleeve 57, until the governor rod sleeve 47 moves to its limit upon the governor rod 14, at a predetermined speed of the governor disc 18. When the sleeve 47 contacts the end of the governor rod 14, the governor mechanism begins to operate and will not allow the throttle lever to open any farther, and in this manner takes control of the driving, allowing and causing only the throttle lever movement necessary to supply the fuel to maintain a predetermined speed. In actual driving practice, when the governor mechanism takes control, the driver will find that he has lost his foot feed and cannot open the throttle lever farther, but on the other hand, may release the accelerator and immediately close the throttle lever, as will now be described.

By referring to Figures 1 and 8, it will be seen that a pin 59 projects laterally from a pedal 60, which may be either the clutch pedal or the brake pedal. A lever 61 is secured to a shaft 62 which is journaled in a bearing 63 carried by a stationary part of the vehicle. A dog 64 is pivoted intermediate its ends on the free end of the lever 61 and is provided with a transversely disposed end portion 65 which engages underneath the lever to hold the dog in operative position for moving the lever when the pin 59 strikes against the beveled free end 66 of the dog as the pedal 60 is depressed. A latch member 67 is fixed intermediate its ends to the shaft 62 and is adapted to hold the accelerator pedal 49 down when the latter is depressed to its limit of movement. In this position of the pedal, shown in dotted lines in Figure 1, the accelerator rod 56 is retracted from its sleeve 57 and the governor mechanism is controlling the throttle lever 42.

To resume manual control, the accelerator pedal is released by depressing the pedal 60 to move the pin 59 downwardly to engage the lever 61 and rock the shaft 62 which swings the latch member 67 out of engagement with the accelerator pedal. The accelerator pedal is immediately returned to normal position through the medium of a spring 68 which is secured at one end to the bell crank lever 51 and is secured at the other end to a stationary part of the vehicle. During downward movement of the pedal 60, as soon as the pin 59 rides off of the beveled edge 66 of the dog 64, a helical spring 69, connected to the upper end of the latch member 67 and to a stationary part of the vehicle, returns the latch member and lever 61 to normal position. When the operator releases the pedal 60, the pin 59 strikes the dog 64 and rocks it on its pivot until the pin rides past the dog and arrives at normal position above the dog ready for the next operation. In this position of the parts the manual control of the throttle lever is again possible.

For limiting movement of the latch member 68 in either direction, a pair of stop pins 70 and 71 are disposed in the path of the lower end of the latch member. For operating the stub shaft 62 independently of the pedal 60, a pedal 72 is secured to the shaft 62 and overhangs the upper end of the accelerator pedal 59. The pedal 72 may be depressed to rock the shaft 62 and disengage the latch member 67 from the depressed accelerator pedal 49.

The heretofore referred to dial 40 and indicator hand 41 controls the speed of rotation of the governor disc 18. The dial is calibrated with numerals 73, as shown in Figure 3, indicative of speed in miles per hour. The indicator hand 41 moves over these numerals and near its free end is equipped with a spring pressed plunger 74, best shown in Figure 4, housed within a handle 75 for manually moving the plunger over a toothed ring 76, hereinafter more fully described. The indicator may be set to indicate any desired speed at which point, the governor disc 18 will have a speed equal to that of the governor rod 14 by virtue of the friction driving disc 30 being positioned by such movement of the indicator hand at a predetermined localized point radially of the governor disc.

The ring 76 is rotatably mounted in a groove 77 formed in the rear face of the dial and a back plate 78 is secured to the rear face of the dial to hold the ring in place. The ring is equipped with a stud 79 which forms a stop to limit manual movement of the indicator hand 41, in a clockwise direction. Thus the driver may set the hand 41 manually at any point on the calibrated scale of the dial from zero up to the point at which the stud 79 is located. By turning the ring axially, the stud may be positioned at any speed indicating numeral on the dial to control the speed of the vehicle within a range from zero up to that speed indicating numeral at which the stud is set.

The lock device for locking the ring 76 in adjusted positions comprises a lock casing 80 mounted on a base plate 81 which is secured to the dial through the medium of bolts 82 which are interchangeably received in two annular series of openings 83 formed in the dial and back plate on sides of the ring. A lock cylinder 84 is rotatably mounted in the casing and is provided with a spiral groove 85 which receives a lug 86 carried by the casing. The cylinder terminates at one end in a tooth 87 adapted to engage between teeth of the ring 76. A key 88 is insertable in a slot 89 formed in the opposite end of the cylinder for moving the cylinder outwardly or inwardly to engage or disengage the tooth 87 with the teeth of the ring. When the cylinder is moved outwardly, the ring may be rotated to dispose the stop lug 79 at any predetermined speed indicating numeral on the dial. When the cylinder is moved inwardly, the ring is locked in adjusted position.

The lock device may be located at a speed indicating numeral beyond which no greater speed is desired. Thus when the ring 76 is unlocked, the stud 79 may be set at any position on the dial from zero up to the lock device but not beyond the lock device. When for any reason it is desired to permanently seal the lock device against being adjusted, a wire 90 is looped through the bolts 82 at the back of the dial and the ends are joined through the medium of a sealing disc 91.

As shown in Figure 2, a seal 92 is disposed at the connection between the cross bar 44 and the link 45. The seal may be broken and the connection severed in the event of failure of the governor mechanism, so that the carburetor may be manually operated in the conventional manner.

Since the operation of the device has been described as the description of the various parts progressed, it is thought that the invention will be fully understood without further explanation.

What is claimed is:

In a speed governor for automotive vehicles, the combination of a carburetor having a throttle lever, a governor rod, a spring connected to the throttle lever and constantly tending to hold the throttle lever open, a member connected to the throttle lever and telescopically receiving the free end of the governor rod, a spring controlled accelerator pedal, a bell crank lever connected to the pedal, an accelerator rod connected to the bell crank lever, a member connected to the throttle lever telescopically receiving the accelerator rod, said accelerator rod being adapted to be retracted from the last named member when the pedal is depressed to permit the throttle lever to be adjusted by the first named spring to a limit determined by the position of said governor rod when the latter is telescoped into the first named member.

CHARLES V. SHEARER.